(12) United States Patent
Wang et al.

(10) Patent No.: US 11,650,482 B2
(45) Date of Patent: May 16, 2023

(54) OPTICAL SYSTEM

(71) Applicant: TDK TAIWAN CORP., Taoyuan (TW)

(72) Inventors: Chao-Hsi Wang, Taoyuan (TW);
Shu-Shan Chen, Taoyuan (TW);
Chao-Chang Hu, Taoyuan (TW);
Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/400,809

(22) Filed: Aug. 12, 2021

(65) Prior Publication Data
US 2022/0050357 A1 Feb. 17, 2022

Related U.S. Application Data

(60) Provisional application No. 63/065,865, filed on Aug. 14, 2020.

(51) Int. Cl.
| | | |
|---|---|---|
| *G02B 27/64* | (2006.01) | |
| *G03B 3/10* | (2021.01) | |
| *G03B 5/02* | (2021.01) | |
| *H04N 5/232* | (2006.01) | |
| *G02B 7/04* | (2021.01) | |
| *G02B 27/00* | (2006.01) | |
| *G02B 27/01* | (2006.01) | |
| *G02C 7/08* | (2006.01) | |
| *G02C 7/10* | (2006.01) | |

(52) U.S. Cl.
CPC ............. *G03B 5/02* (2013.01); *G02B 7/04* (2013.01); *G02B 27/0093* (2013.01); *G02B 27/0172* (2013.01); *G02B 27/646* (2013.01); *G02C 7/088* (2013.01); *G02C 7/10* (2013.01); *G03B 3/10* (2013.01); *H04N 5/23248* (2013.01); *G02B 2027/014* (2013.01); *G02B 2027/0178* (2013.01); *G03B 2205/0046* (2013.01); *G03B 2205/0061* (2013.01)

(58) Field of Classification Search
CPC .... G03B 5/02; G03B 3/10; G03B 2205/0046; G02B 27/646; G02B 7/04
See application file for complete search history.

(56) References Cited

U.S. PATENT DOCUMENTS

| | | | | |
|---|---|---|---|---|
| 7,509,041 B2* | 3/2009 | Hosono | ................ | H04N 5/2259 396/85 |
| 7,856,181 B2* | 12/2010 | Maezono | ............... | G03B 35/00 348/42 |
| 2008/0074001 A1* | 3/2008 | Ide | ........................... | G03B 9/02 310/330 |
| 2021/0333529 A1* | 10/2021 | Yao | .................... | G02B 13/0045 |

FOREIGN PATENT DOCUMENTS

EP 1939661 A1 * 7/2008 ............. G02B 7/102

* cited by examiner

*Primary Examiner* — Minh Q Phan
(74) *Attorney, Agent, or Firm* — Muncy, Geissler, Olds & Lowe, P.C.

(57) ABSTRACT

An optical system is provided, including a first optical module, a second optical module, and a light-quantity adjustment module. The first optical module, the second optical module, and the light-quantity adjustment module are arranged in a direction of an optical axis. The first optical module and the second optical module are movable in the direction of the optical axis.

17 Claims, 14 Drawing Sheets

OPTICAL SYSTEM

CROSS REFERENCE TO RELATED APPLICATIONS

This application claims the benefit of U.S. Provisional Application No. 63/065,865, filed Aug. 14, 2020, the entirety of which is incorporated by reference herein.

BACKGROUND OF THE INVENTION

Field of the Invention

The present disclosure relates to an optical system, and more particularly to an optical system driven by piezoelectric units.

Description of the Related Art

As technology has developed, it has become more common to include image-capturing and video-recording functions into many types of modern electronic devices, such as notebooks computers, smartphones, and digital cameras. These electronic devices are used more and more often. In addition to the new models that have been developed to be more convenient, thin, and lightweight, it is also desirable to provide optical qualities that are more stable and better, offering more choices for consumers.

Electronic devices that have image-capturing or video-recording functions normally include one or more lenses, thereby performing such functions as auto focus (AF), zooming, and optical image stabilization (OIS). However, the trend in modern mobile devices is to have a higher image quality within limited volumes and to avoid unnecessary interference. As a result, the present disclosure provides an optical system that is different from the prior ones, to increase its optic quality and also achieve system stability.

BRIEF SUMMARY OF THE INVENTION

An optical system is provided in the present disclosure. The optical system includes a first optical module, a second optical module, and a light-quantity adjustment module. The first optical module, the second optical module, and the light-quantity adjustment module are arranged in a direction of an optical axis.

In some embodiments, the optical system further includes a first optical-path adjustment module and a second optical-path adjustment module. The first optical-path adjustment module changes the traveling direction of a light ray from a first direction to the direction of the optical axis. The second optical-path adjustment module changes the traveling direction of the light ray from the direction of the optical axis to a second direction. The first direction is different from the second direction. The first optical module, the second optical module, the first optical-path adjustment module, the second optical-path adjustment module, and the light-quantity adjustment module are arranged in the direction of the optical axis. In some embodiments, the first direction and the second direction are perpendicular to the direction of the optical axis. In some embodiments, the first direction is parallel to the second direction.

In some embodiments, the optical system further includes a fixed portion. The fixed portion includes a housing. The first optical module and the second optical module are disposed within the housing.

In some embodiments, the light-quantity adjustment module is positioned between the first optical module and the second optical module, and the light-quantity adjustment module is movable along the direction of the optical axis relative to the housing.

In some embodiments, the light-quantity adjustment module is connected to the first optical module, and the light-quantity adjustment module and the first optical module are movable along the direction of the optical axis relative to the housing simultaneously.

In some embodiments, the light-quantity adjustment module is connected to the second optical module, and the light-quantity adjustment module and the second optical module are movable along the direction of the optical axis relative to the housing simultaneously.

In some embodiments, the light-quantity adjustment module is positioned between the first optical-path adjustment module and the first optical module.

In some embodiments, the housing has a first surface inside the housing, and the first surface is parallel to the first direction. The light-quantity adjustment module is fixedly disposed on the first surface.

In some embodiments, the optical system further includes a third optical module positioned between the light-quantity adjustment module and the first optical module. The third optical module is fixedly connected to the light-quantity adjustment module and the housing.

In some embodiments, the optical system further includes a third optical module positioned between the first optical-path adjustment module and the light-quantity adjustment module. The light-quantity adjustment module is fixedly connected to the third optical module or the housing.

In some embodiments, the optical system further includes a first optical module driving assembly and a second optical module driving assembly. The first optical module driving assembly includes a first piezoelectric unit. The first piezoelectric unit includes a first piezoelectric element and a first transmitting element. The first piezoelectric element is connected to the housing. The first transmitting element is connected to the first piezoelectric element and the first optical module. The first transmitting element transmits a first driving force to the first optical module, so that the first optical module is movable relative to the housing. The second optical module driving assembly includes a second piezoelectric unit. The second piezoelectric unit includes a second piezoelectric element and a second transmitting element. The second piezoelectric element is connected to the housing. The second transmitting element is connected to the second piezoelectric element and the second optical module. The second transmitting element transmits a second driving force to the second optical module, so that the second optical module is movable relative to the housing.

In some embodiments, the optical system further includes a first optical-path adjustment-module driving assembly and a second optical-path adjustment-module driving assembly. The first optical-path adjustment-module driving assembly includes a third piezoelectric unit. The third piezoelectric unit includes a third piezoelectric element and a third transmitting element. The third piezoelectric element is connected to the fixed portion. The third transmitting element is connected to the third piezoelectric element and the first optical-path adjustment module. The third transmitting element transmits a third driving force to the first optical-path adjustment module, so that the first optical-path adjustment module is movable relative to the fixed portion. The second optical-path adjustment-module driving assembly includes a fourth piezoelectric unit. The fourth piezoelectric unit includes a fourth piezoelectric element and a fourth transmitting element. The fourth piezoelectric element is connected to the fixed portion. The fourth transmitting element is connected to the fourth piezoelectric element and the second optical-path adjustment module. The fourth transmitting element transmits a fourth driving force to the second optical-path adjustment module, so that the second optical-path adjustment module is movable relative to the fixed portion.

In some embodiments, the light-quantity adjustment module includes a frame and a light-quantity adjustment element. The light-quantity adjustment element is disposed within the frame, and movable relative to the frame.

In some embodiments, the optical system further includes a control assembly. The light-quantity adjustment module further includes a driving portion and a conducting portion. The driving portion is connected to the light-quantity adjustment element. One end of the conducting portion is connected to the driving portion, and the other end of the conducting portion extends out of the light-quantity adjustment module and is electrically connected to the control assembly. The driving portion receives a signal from the conducting portion, driving the light-quantity adjustment element to move relative to the frame.

In some embodiments, the optical system further includes a first sensing magnet, a first sensing element, a second sensing magnet, a second sensing element, a third sensing magnet, and a third sensing element. The first sensing magnet is connected to the first optical module. The first sensing element corresponds to the first sensing magnet, is disposed at the housing, and senses the position of the first optical module relative to the housing. The second sensing magnet is connected to the second optical module. The second sensing element corresponds to the second sensing magnet, is disposed at the housing, and senses the position of the second optical module relative to the housing. The third sensing magnet is connected to the light-quantity adjustment module. The third sensing element corresponds to the third sensing magnet, is disposed at the housing, and senses the position of the light-quantity adjustment module relative to the housing.

In some embodiments, of the first sensing element, the second sensing element, and the third sensing element, no two overlap each other when viewed in the direction of the optical axis.

In some embodiments, of the first sensing magnet, the second sensing magnet, and the third sensing magnet, no two overlap each other when viewed in the direction of the optical axis.

In some embodiments, of the first sensing element, the second sensing element, and the third sensing element, no two overlap each other when viewed in a direction that is perpendicular to the direction of the optical axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
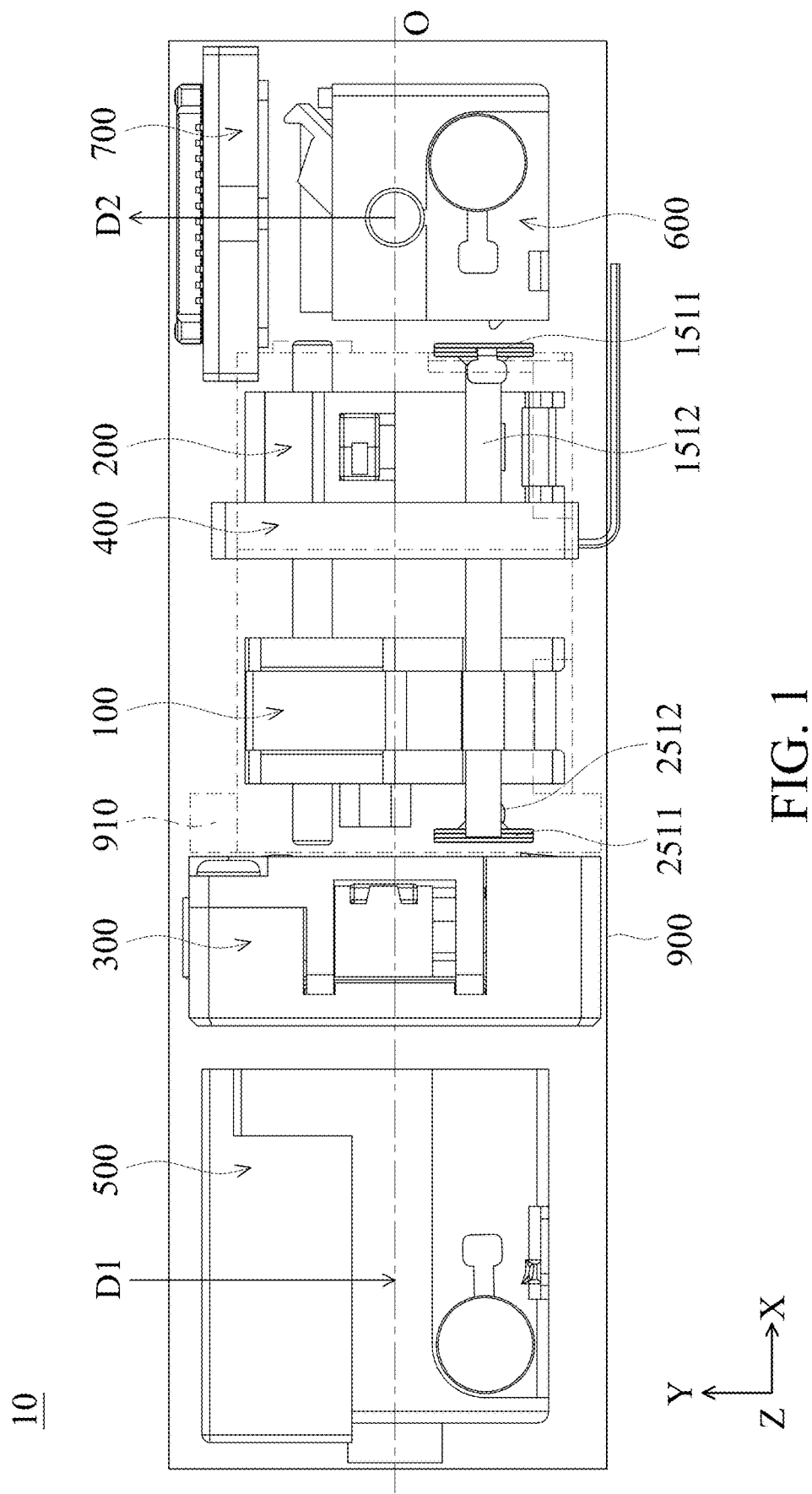
FIG. 1 is a side view of an optical system, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical system is provided in the present disclosure, including a plurality of optical modules and a plurality of optical-path adjustment modules. The optical modules and the optical-path adjustment modules may include one or more optical elements (e.g. lenses) for converging and/or diverging rays of light, so as to perform the functions of zooming and focusing. The optical system of the present disclosure may further include a light-quantity adjustment module for adjusting the light quantity that enters the optical modules. In particular, the movements of the optical modules and the optical-path adjustment modules are generated via respective piezoelectric units. On the other hand, an electromagnetic driving mechanism is utilized by the light-quantity adjustment module to adjust the entering quantity of light. Particularly, the configuration of the present disclosure may reduce the magnetic interference between the electromagnetic driving mechanism of the light-quantity adjustment module and the sensing magnetic elements equipped on the optical modules. This may provide good system stability and optical quality.

Referring to FIG. 1, FIG. 1 is a side view of an optical system 10, according to some embodiments of the present disclosure. As shown in FIG. 1, the optical system 10 may include a first optical module 100, a second optical module 200, a third optical module 300, a light-quantity adjustment module 400, a first optical-path adjustment module 500, a second optical-path adjustment module 600, an image sensing assembly 700, and a fixed portion 900. The first optical module 100, the second optical module 200, the third optical module 300, the light-quantity adjustment module 400, the first optical-path adjustment module 500, the second optical-path adjustment module 600, and the image sensing assembly 700 are disposed in the fixed portion 900. Specifically, the fixed portion 900 includes a housing 910, and the first optical module 100 and the second optical module 200 are disposed inside the housing 910. The first optical module 100, the second optical module 200, the third optical module 300, the light-quantity adjustment module 400, the first optical-path adjustment module 500, and the second optical-path adjustment module 600 are arranged in a direction of an optical axis O (or along the optical axis). In some embodiments, rays of light enter the first optical-path adjustment module 500 in the first direction D1, and the first optical-path adjustment module 500 changes the traveling direction of the rays of light from the first direction D1 to the direction of the optical axis O. The rays of light pass through the third optical module 300, the first optical module 100, the light-quantity adjustment module 400, and the second optical module 200 in sequence in the direction of the optical axis O. Next, the rays of light enter the second optical-path adjustment module 600. The second optical-path adjustment module 600 then changes the traveling direction of the rays of light from the direction of the optical axis O to the second direction D2. After that, the rays of light enter the image sensing assembly 700 in the second direction D2. In the embodiments shown in FIG. 1, the first direction D1 is different from the second direction D2. The first direction D1 and the second direction D2 are perpendicular to the direction of the optical axis O. The first direction D1 is parallel to the second direction D2. As a result, the miniaturization of the optical system 10 may be achieved by alternating the traveling direction of the light. In some other embodiments according to the present disclosure, the first direction D1 and the second direction D2 may be adjusted in accordance with the light incident direction and/or the configuration of the image sensing assembly 700. Therefore, the first direction D1 and the second direction D2 are not limited to the configuration shown in FIG. 1.

In some embodiments, the first optical module 100 and the second optical module 200 are movable in the direction of the optical axis O relative to the housing 910, achieving the effect of optical zooming and optical focusing. Specifically, in some embodiments, the first optical module 100 is utilized for optical zooming. At the same time, the second optical module 200 is utilized for optical focusing. In addition, the third optical module 300 may be utilized to perform optical image stabilization (OIS), and the third optical module 300 is disposed outside of the housing 910 that is closer to the light incident end.

Figure 2:
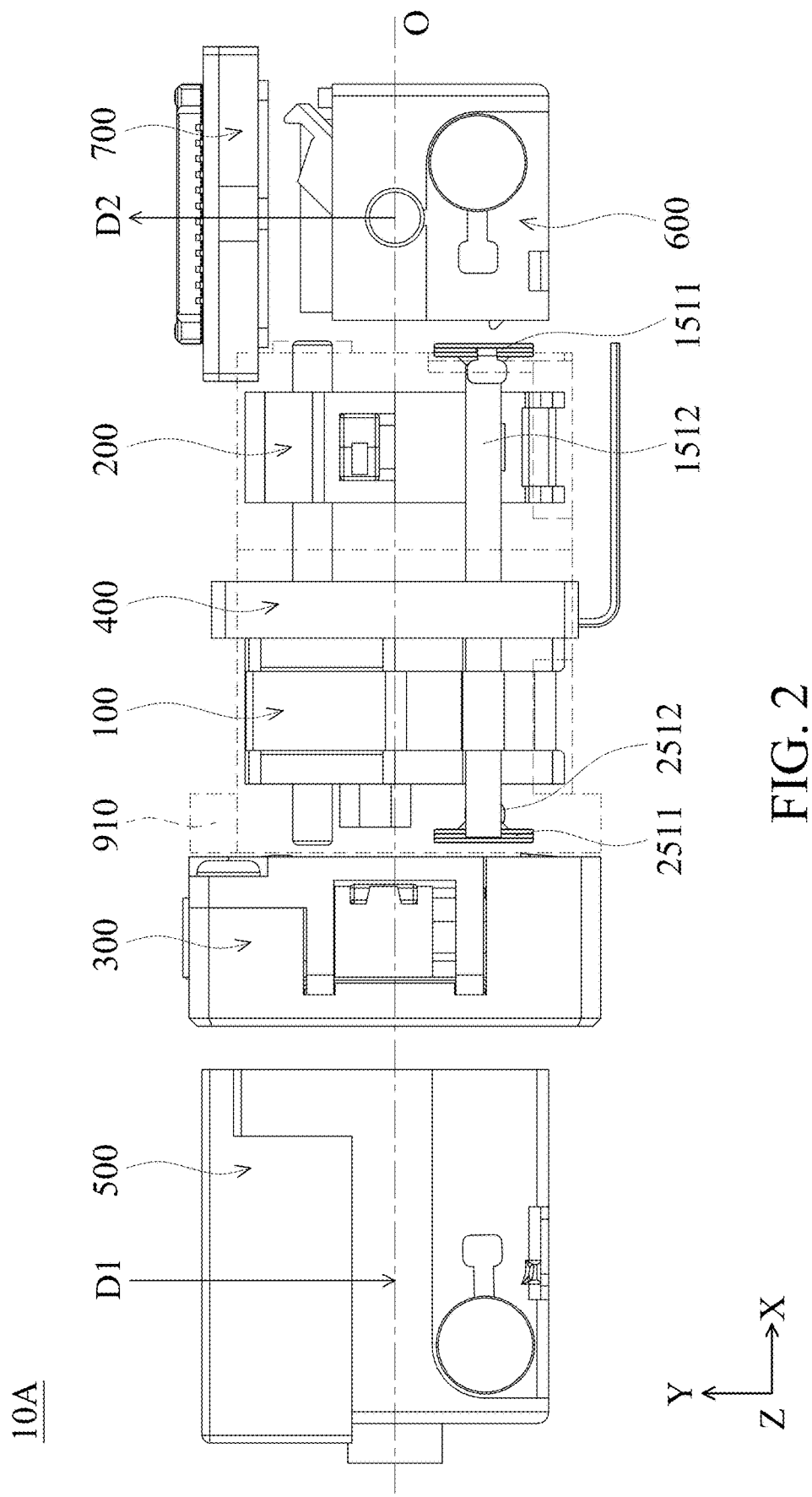
FIG. 2 is a side view of an optical system, according to some other embodiments of the present disclosure.

Next, referring to FIGS. 1 and 2, FIG. 2 is a side view of an optical system 10A, according to some other embodiments of the present disclosure. Generally, the optical system 10A shown in FIG. 2 is similar to the optical system 10 shown in FIG. 1. The difference therebetween is the position in which the light-quantity adjustment module 400 is disposed. In the embodiments shown in FIGS. 1 and 2, the light-quantity adjustment module 400 may be positioned between the first optical module 100 and the second optical module 200, and the light-quantity adjustment module 400 is also movable along the direction of the optical axis O relative to the housing 910. In the embodiment shown in FIG. 1, the light-quantity adjustment module 400 is connected to the second optical module 200, and the light-quantity adjustment module 400 and the second optical module 200 are movable along the direction of the optical axis O relative to the housing 910 simultaneously. In the embodiment shown in FIG. 2, the light-quantity adjustment module 400 is connected to the first optical module 100, and the light-quantity adjustment module 400 and the first optical module 100 are movable along the direction of the optical axis O relative to the housing 910 simultaneously.

Figure 3:
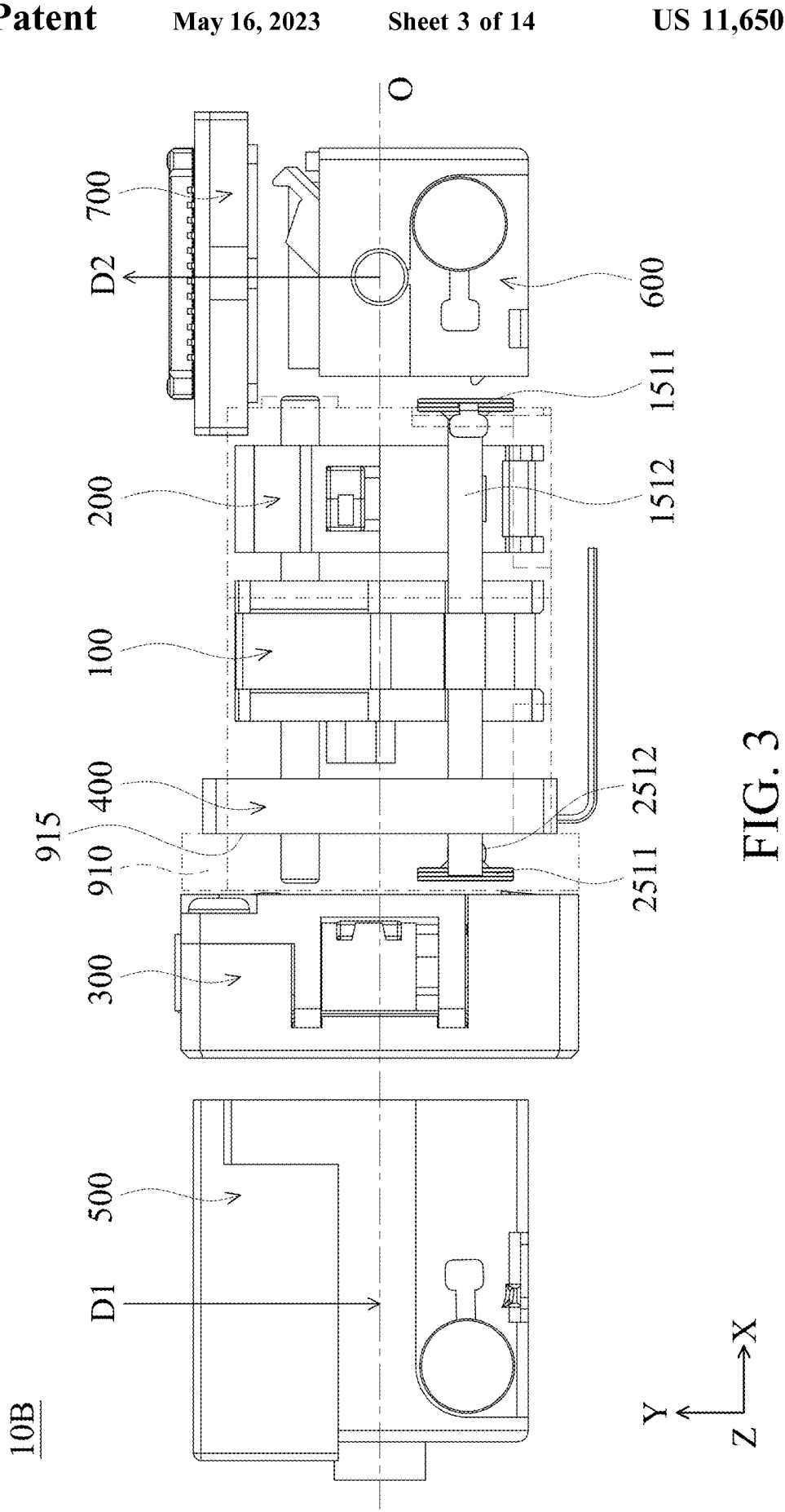
FIG. 3 is a side view of an optical system, according to yet some other embodiments of the present disclosure.
Figure 4:
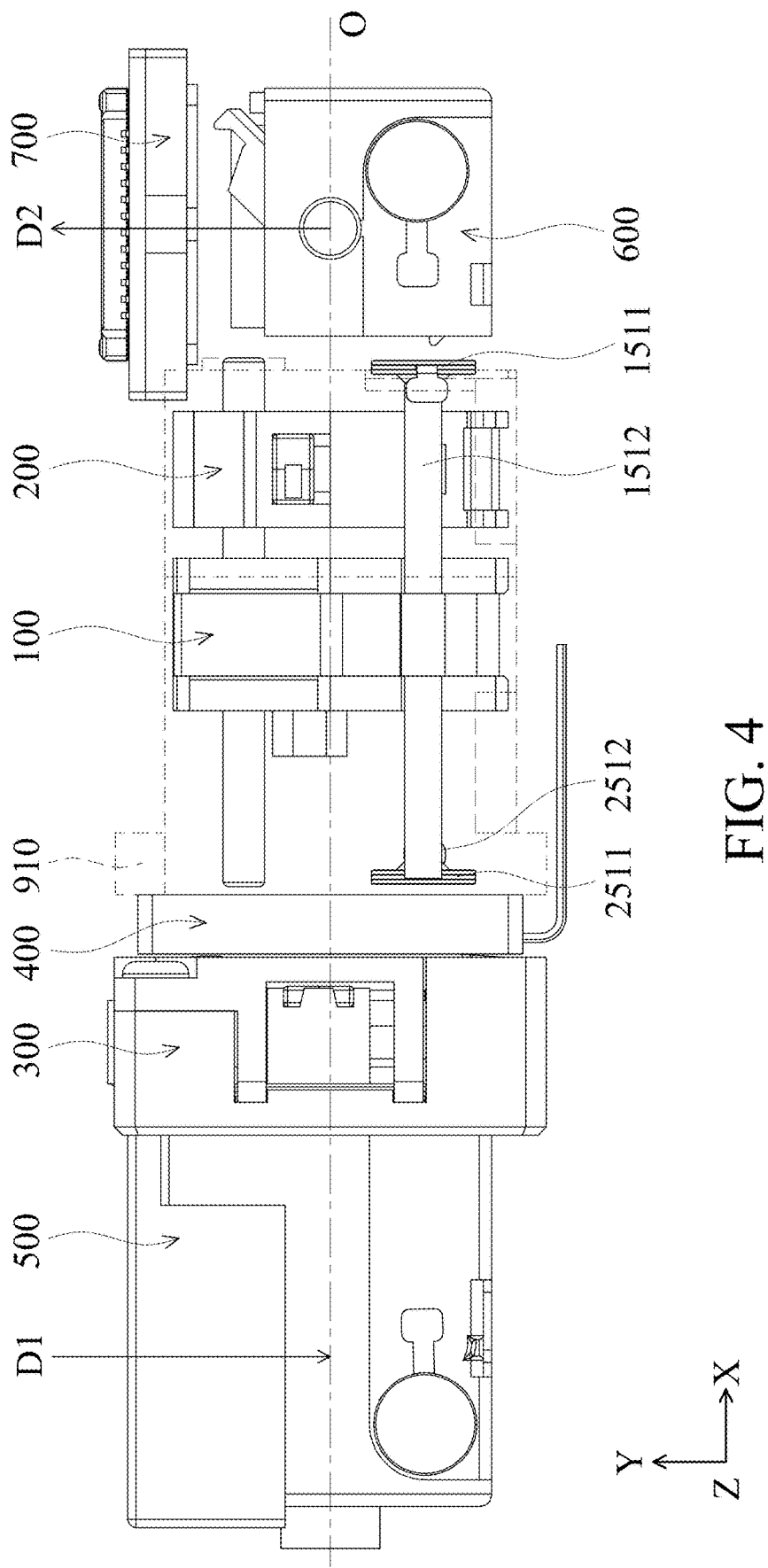
FIG. 4 is a side view of an optical system, according to some further embodiments of the present disclosure.
Figure 5:
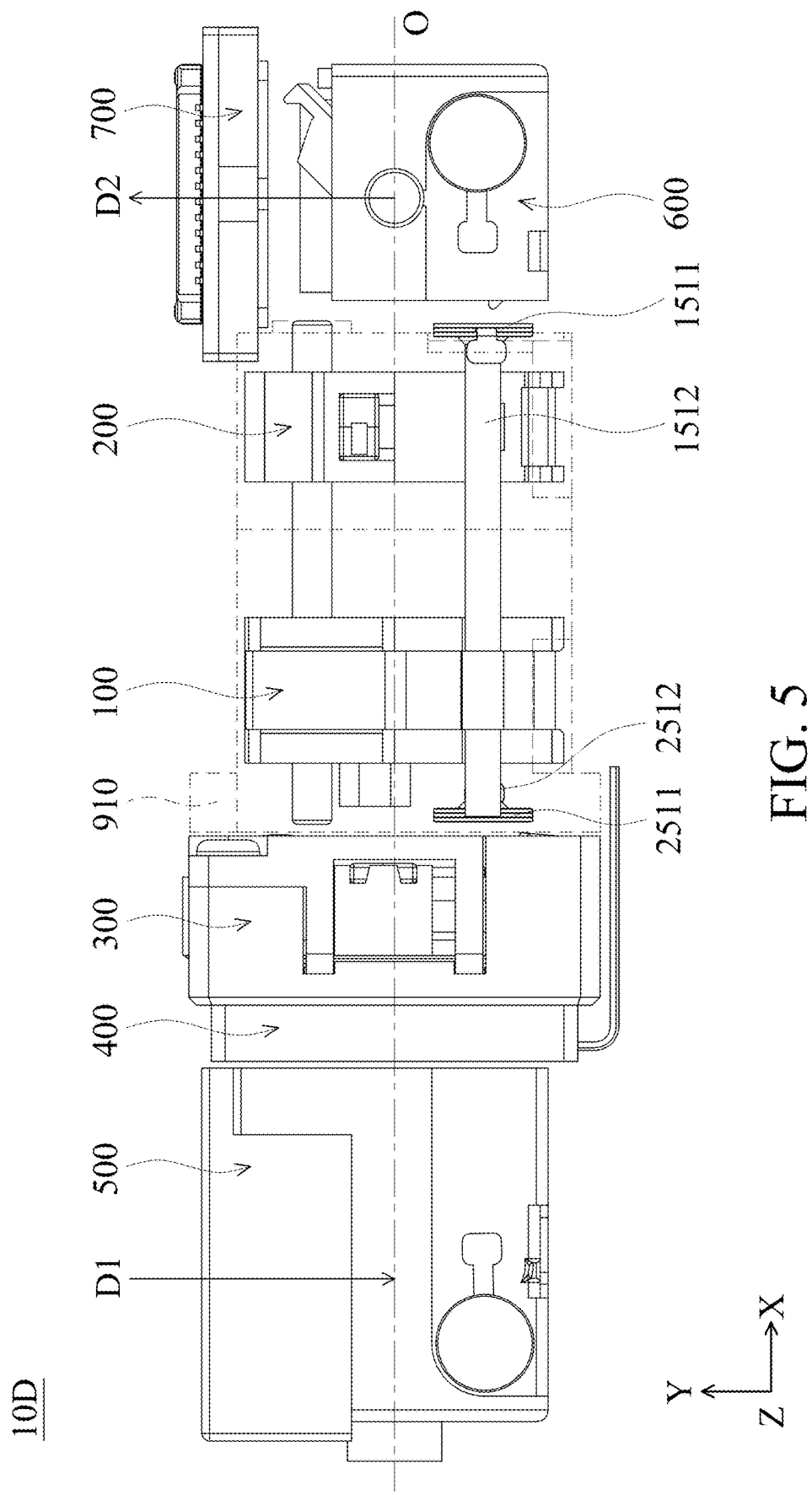
FIG. 5 is a side view of an optical system, according to some other different embodiments of the present disclosure.

Next, referring to FIGS. 3, 4, and 5, FIGS. 3, 4, and 5 are respective side views of an optical system 10B, an optical system 10C, an optical system 10D, according to some embodiments of the present disclosure. Generally, the optical system 10B, the optical system 10C, and the optical system 10D shown in FIGS. 3, 4, and 5 are similar to the optical system 10 shown in FIG. 1. The difference therebetween is the position in which the light-quantity adjustment module 400 is disposed. In the embodiments shown in FIGS. 3, 4, and 5, the light-quantity adjustment module 400 is positioned between the first optical-path adjustment module 500 and the first optical module 100.

In the embodiment shown in FIG. 3, the light-quantity adjustment module 400 is disposed inside the housing 910. The housing 910 may have a first surface 915 that is parallel to the first direction D1 inside the housing 910, and the light-quantity adjustment module 400 is fixedly disposed on the first surface 915. That is, the light-quantity adjustment module 400 is not movable relative to the housing 910 in this embodiment. In addition, the difference between the embodiment shown in FIG. 3 and those shown in FIGS. 1 and 2 is that, alternatively, the rays of light pass through the third optical module 300, the light-quantity adjustment module 400, the first optical module 100, and the second optical module 200 in sequence in the direction of the optical axis O.

In the embodiment shown in FIG. 4, the light-quantity adjustment module 400 is disposed outside the housing 910. In some embodiments, the light-quantity adjustment module 400 is fixedly connected to the third optical module 300 or the housing 910, wherein the third optical module 300 is disposed between the first optical-path adjustment module 500 and the light-quantity adjustment module 400. Similar to the embodiment shown in FIG. 3, the rays of light pass through the third optical module 300, the light-quantity adjustment module 400, the first optical module 100, and the second optical module 200 in sequence in the direction of the optical axis O in FIG. 4.

In the embodiment shown in FIG. 5, the light-quantity adjustment module 400 is disposed between the first optical-path adjustment module 500 and the third optical module 300, wherein the third optical module 300 is disposed between the light-quantity adjustment module 400 and the first optical module 100. In some embodiments, the third optical module 300 is fixedly connected to the light-quantity adjustment module 400 and the housing 910, so that the light-quantity adjustment module 400 is indirectly fixed to the housing 910 and not movable relative to the housing 910. In addition, the difference between the embodiment shown in FIG. 5 and those shown in FIGS. 3 and 4 is that, alternatively, the rays of light pass through the light-quantity adjustment module 400, the third optical module 300, the first optical module 100, and the second optical module 200 in sequence in the direction of the optical axis O.

Figure 6:
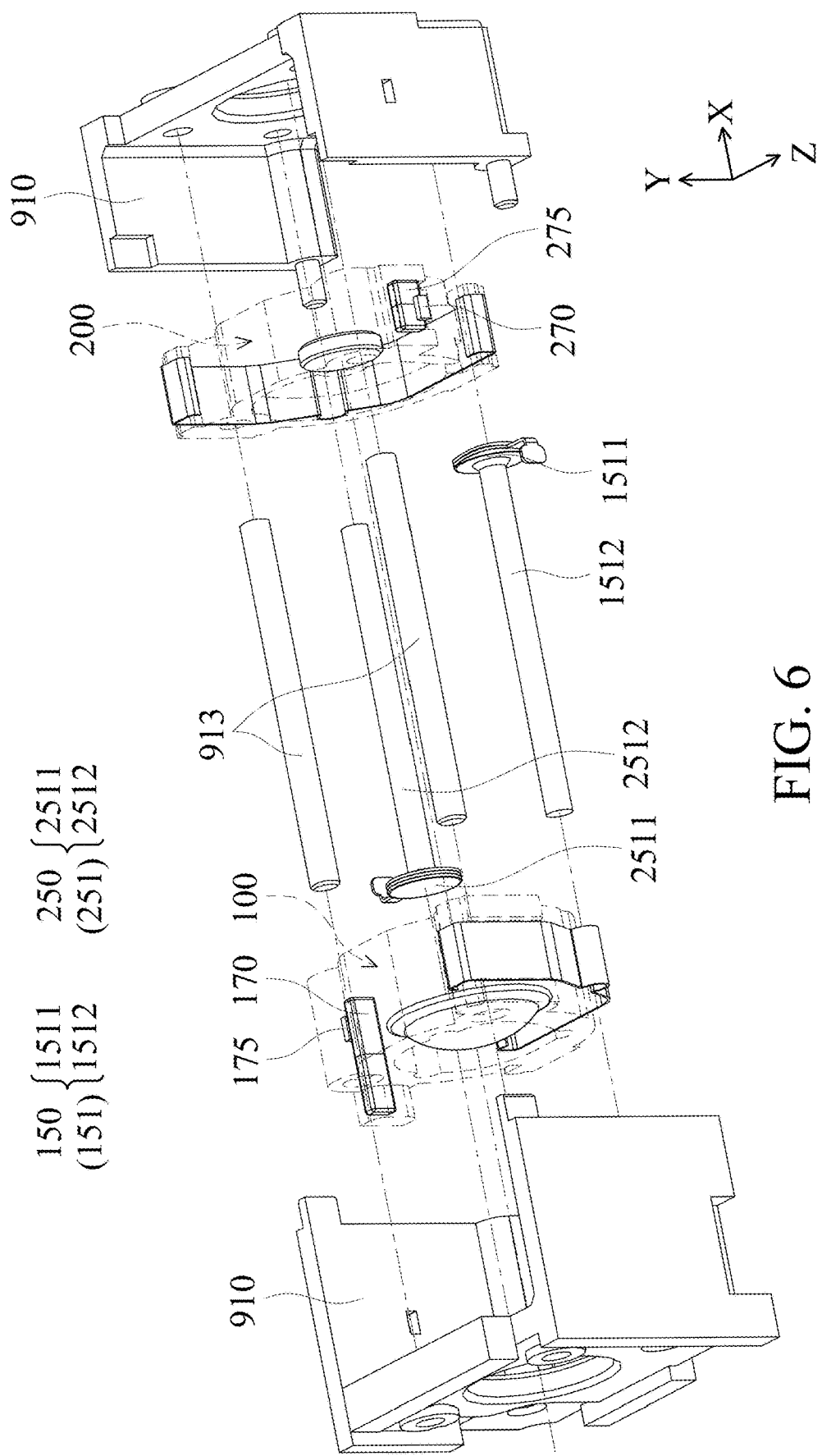
FIG. 6 is an exploded view of a housing and the internal elements inside the housing, according to some embodiments of the present disclosure.
Figure 7:
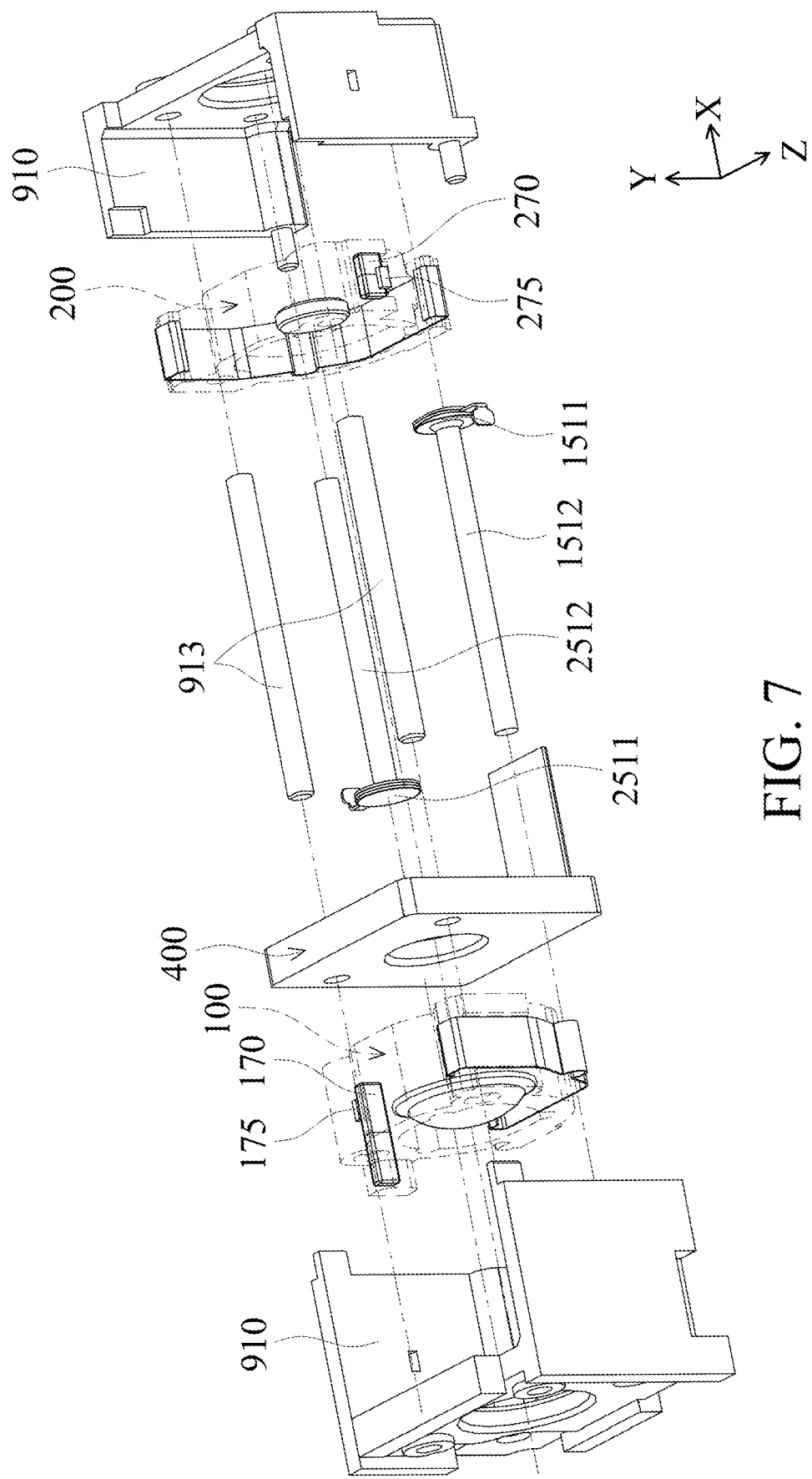
FIG. 7 is an exploded view of a housing and the internal elements inside the housing, according to some other embodiments of the present disclosure.

Referring to FIGS. 6 and 7, FIGS. 6 and 7 are respective exploded views of the housing 910 and the internal elements inside the housing 910, according to some different embodiments of the present disclosure. As shown in FIGS. 6 and 7, the optical system 10, the optical system 10A, the optical system 10B, the optical system 10C, or the optical system 10D may further include a first optical module driving assembly 150 and a second optical module driving assembly 250, respectively. The first optical module driving assembly 150 includes a first piezoelectric unit 151. The first piezoelectric unit 151 includes a first piezoelectric element 1511 and a first transmitting element 1512. The first piezoelectric element 1511 is fixedly connected to the housing 910. The first transmitting element 1512 may have an elongated rod shape extending along the direction of the optical axis O, connecting the first piezoelectric element 1511 and the first optical module 100 (as shown in FIG. 1 to FIG. 5). The first driving force is transmitted by the first transmitting element 1512 to the first optical module 100 through the deformation of the first piezoelectric element 1511 in the direction of the optical axis O, so that the first optical module 100 is movable in the direction of the optical axis O relative to the housing 910. Similarly, the second optical module driving assembly 250 includes a second piezoelectric unit 251. The second piezoelectric unit 251 includes a second piezoelectric element 2511 and a second transmitting element 2512. The second piezoelectric element 2511 is fixedly connected to the housing 910. The second transmitting element 2512 may have an elongated rod shape extending along the direction of the optical axis O, connecting the second piezoelectric element 2511 and the second optical module 200. The second driving force is transmitted by the second transmitting element 2512 to the second optical module 200 through the deformation of the second piezoelectric element 2511 in the direction of the optical axis O, so that the second optical module 200 is movable in the direction of the optical axis O relative to the housing 910.

It should be understood that, in some embodiments wherein the light-quantity adjustment module 400 is positioned between the first optical module 100 and the second optical module 200 (as shown in FIG. 7), the light-quantity adjustment module 400 may also be driven by the first optical module driving assembly 150 or the second optical module driving assembly 250 to move in the direction of the optical axis O. For example, when the light-quantity adjustment module 400 is connected to the first optical module 100, the light-quantity adjustment module 400 may be driven by the first optical module driving assembly 150 together with the first optical module 100 to be movable in the direction of the optical axis O. Similarly, when the light-quantity adjustment module 400 is connected to the second optical module 200, the light-quantity adjustment module 400 may be driven by the second optical module driving assembly 250 together with the second optical module 200.

In the embodiments shown in FIGS. 6 and 7, the fixed portion 900 further includes two guiding elements 913 that are fixedly connected to the housing 910, and pass through the first optical module 100 and the second optical module 200. Of course, in some embodiments where the light-quantity adjustment module 400 is positioned inside the housing 910, the guiding elements 913 also pass through the light-quantity adjustment module 400. The guiding elements 913 may have elongated rod shapes extending along the direction of the optical axis O, guiding the first optical module 100 and the second optical module 200 to move in the direction of the optical axis O relative to the housing 910. In some particular embodiments, the guiding elements 913 may also guide the light-quantity adjustment module 400 to move in the direction of the optical axis O relative to the housing 910. In some embodiments, two guiding elements 913, the first transmitting element 1512 and the second transmitting element 2512 are respectively disposed in four different corners inside the housing 910, improving the stability of overall mechanism. In some embodiments, there may be one guiding element 913 or there may be more than two guiding elements 913, depending on actual needs. In addition, the positions of the guiding elements 913, the first transmitting element 1512, and the second transmitting element 2512 are not limited to the examples shown in the present disclosure, but may be selected based on actual needs.

Figure 8:
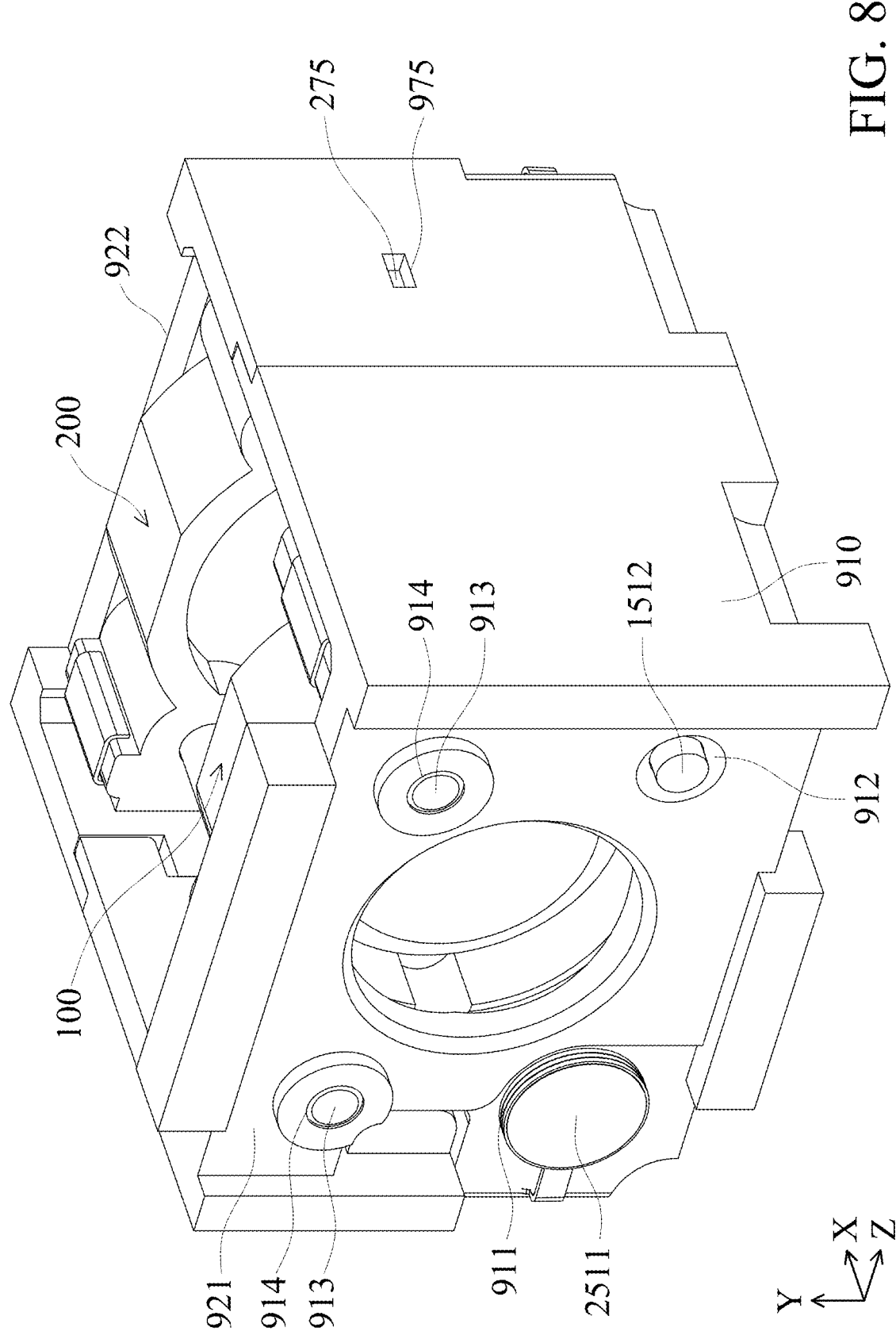
FIG. 8 is a perspective view of the housing and the internal elements inside the housing, according to some embodiments of the present disclosure.

Referring to FIG. 8, FIG. 8 is a perspective view of the housing 910 and the internal elements inside the housing 910, according to some embodiments of the present disclosure. As shown in FIG. 8, the side surface of the housing 910 on the first side 921 includes a first opening 911, a second opening 912 and two third openings 914. The first opening 911 corresponds to the second optical module driving assembly 250. Specifically, the second piezoelectric element 2511 of the second optical module driving assembly 250 covers the first opening 911, and an end of the second transmitting element 2512 passes through the first opening 911 to connect with the second piezoelectric element 2511 that is located outside the housing 910. The second opening 912 corresponds to the first optical module driving assembly 150. Specifically, the end, that is not connected to the first piezoelectric element 1511, of the first transmitting element 1512 of the first optical module driving assembly 150 passes through the second opening 912 and may protrude from the housing 910. The two third openings 914 respectively correspond to the two guiding elements 913. The guiding elements 913 are fixed to the housing 910 via the third openings 914. Similarly, the side surface of the housing 910 on the opposite second side 922 also includes a first opening 911, a second opening 912 and two third openings 914. Similar to the first side 921, the first opening 911 on the second side 922 corresponds to the first optical module driving assembly 150, the first piezoelectric element 1511 covers the first opening 911, and an end of the first transmitting element 1512 passes through the first opening 911 to connect with the first piezoelectric element 1511 that is located outside the housing 910. The second opening 912 on the second side 922 corresponds to the second optical module driving assembly 250. The end, that is not connected to the second piezoelectric element 2511, of the second transmitting element 2512 passes through the second opening 912 and may protrude from the housing 910. The ends of the guiding elements 913 that extend to the second side 922 are also fixed to the housing 910 via the third openings 914. It should be understood that the amount of the third openings 914 corresponds to the amount of the guiding elements 913. Additionally, in some other embodiments, the third openings 914 may have enclosed structures, so that the guiding elements 913 are not exposed from the housing 910.

Next, referring to FIG. 6 to FIG. 8, in some embodiments, the optical system 10, the optical system 10A, the optical system 10B, the optical system 10C, and the optical system 10D may further include a first sensing magnet 170, a first sensing element 175, a second sensing magnet 270, and a second sensing element 275. The first sensing magnet 170 and the second sensing magnet 270 are connected to the first optical module 100 and the second optical module 200, respectively. The first sensing element 175 and the second sensing element 275 correspond to the first sensing magnet 170 and the second sensing magnet 270, respectively. Both the first sensing element 175 and the second sensing element 275 are disposed at the housing 910 for sensing the positions of the first optical module 100 and the second optical module 200 relative to the housing 910. In some embodiments of the present disclosure, the first sensing magnet 170 and the second sensing magnet 270 are located on opposite sides with respect to the optical axis (e.g. two opposite sides in Z direction) when viewed in the direction of the optical axis O. Obviously, the first sensing element 175 and the second sensing element 275 are also located on opposite sides with respect to the optical axis. In some embodiments, the housing 910 includes two recesses 975 (only one of them is shown in FIG. 8) that correspond to the first sensing element 175 and the second sensing element 275, respectively. The first sensing element 175 and the second sensing element 275 are accommodated in the recesses 975, so as to be fixed to the housing 910.

It should be noted that each of the first optical module 100 and the second optical module 200 may include one or more optical elements (e.g. lenses). The amounts and sizes of these optical elements may be selected based on the optical effect (e.g. zooming, focusing, etc.) requirements of users, and thus are not limited to the amounts or sizes illustrated in the present disclosure.

Figure 9:
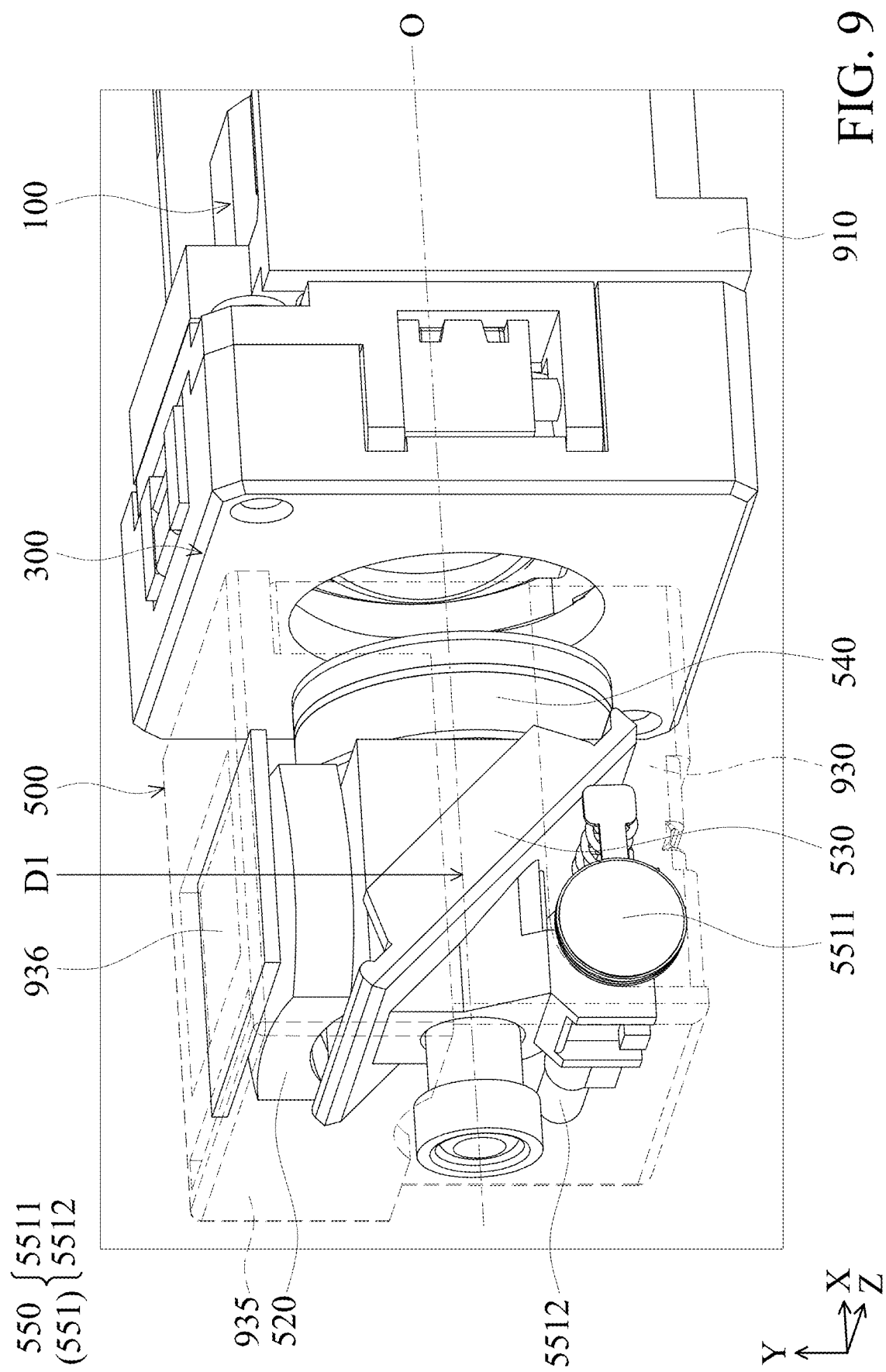
FIG. 9 is a partial enlarged view of the optical system, particularly of the side that includes the first optical-path adjustment module, according to some embodiments of the present disclosure.

Referring to FIG. 9, FIG. 9 is a partial enlarged view of the optical system 10, the optical system 10A, the optical system 10B, the optical system 10C, or the optical system 10D, particularly of the side that includes the first optical-path adjustment module 500, according to some embodiments of the present disclosure. In some embodiments, the fixed portion 900 further include a first bottom 930 and a cover 935. The first optical-path adjustment module 500 is accommodated in the first bottom 930, while the cover 935 covers on top of the first bottom 930. The cover 935 includes a light incident opening 936, through which rays of light enter the first optical-path adjustment module 500. In some embodiments, the first optical-path adjustment module 500 includes a first optical element 520, a first light path adjusting element 530, and a second optical element 540. When rays of light enter the first optical-path adjustment module 500 in the first direction D1, the light may start from passing through the first optical element 520, so that the light may be converged before entering the first light path adjusting element 530. The first light path adjusting element 530 has a reflective surface for changing the traveling direction of the light from the first direction D1 to the direction of the optical axis O. Before the light leaves the first optical-path adjustment module 500, the light may pass through the second optical element 540, so as to be converged/diverged based on the required optical effects. It should be noted that, in some other embodiments, the first optical-path adjustment module 500 may not include the first optical element 520 and/or the second optical element 540, or may include one or more first optical elements 520 and/or second optical elements 540. Suitable configuration may be selected based on actual needs.

In some embodiments according to the present disclosure, the optical system 10, the optical system 10A, the optical system 10B, the optical system 10C, or the optical system 10D further includes a first optical-path adjustment-module driving assembly 550 for driving the first optical-path adjustment module 500. The first optical-path adjustment-module driving assembly 550 includes a third piezoelectric unit 551. The third piezoelectric unit 551 includes a third piezoelectric element 5511 and a third transmitting element 5512. The third piezoelectric element 5511 is fixedly connected to the fixed portion 900, especially to the first bottom 930. The third transmitting element 5512 may have an elongated rod shape extending along Z direction, connecting the third piezoelectric element 5511 and the first light path adjusting element 530. The third driving force is transmitted by the third transmitting element 5512 to the first light path adjusting element 530 or the entire first optical-path adjustment module 500 through the deformation of the third piezoelectric element 5511 in Z direction, so that the first light path adjusting element 530 or the entire first optical-path adjustment module 500 is movable in Z direction relative to the fixed portion 900. This may achieve the effect of optical compensation, whereby improving the optical quality.

Figure 10:
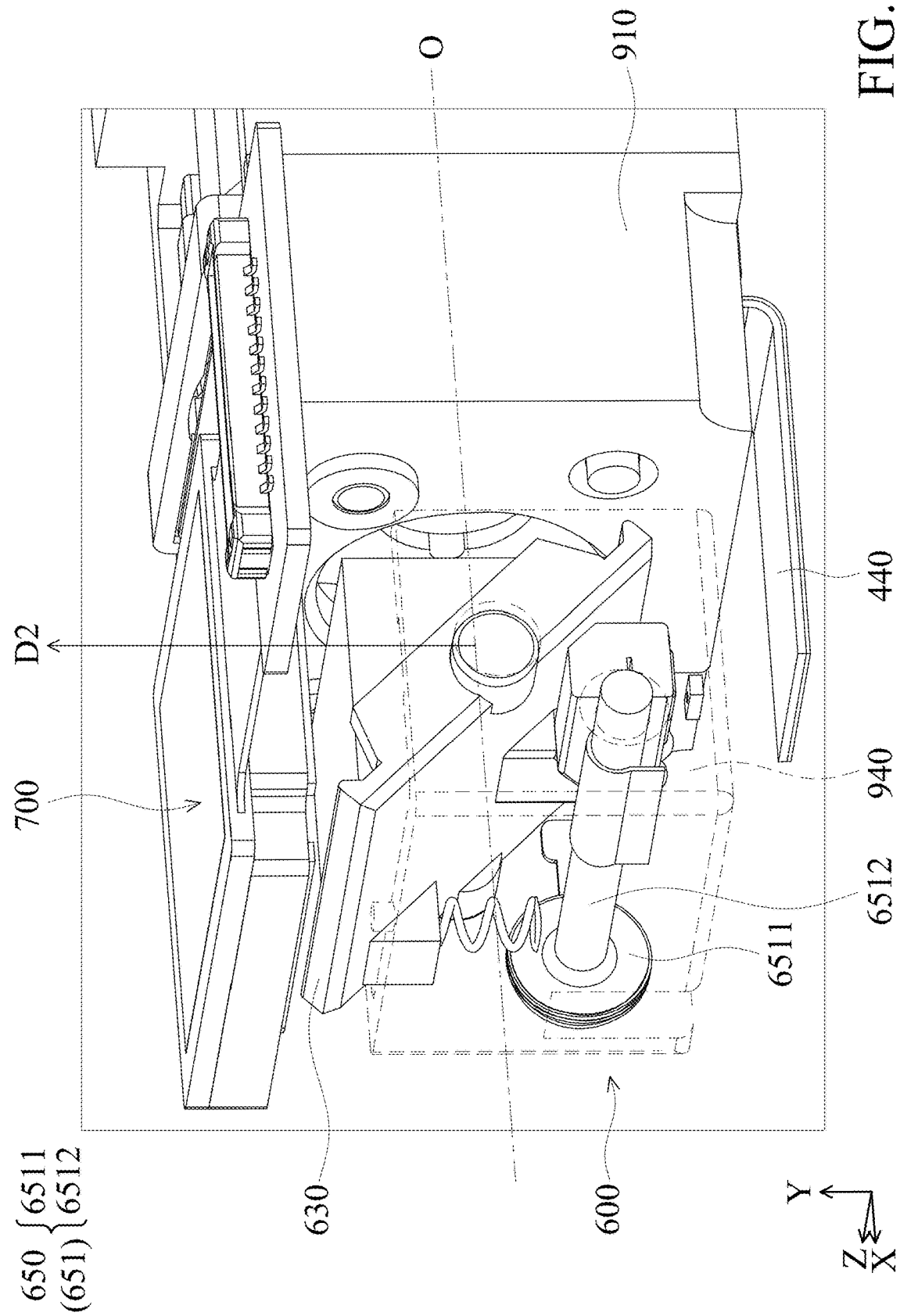
FIG. 10 is a partial enlarged view of the optical system, particularly of the side that includes the second optical-path adjustment module and the image sensing assembly, according to some embodiments of the present disclosure.

Next, referring to FIG. 10, FIG. 10 is a partial enlarged view of the optical system 10, the optical system 10A, the optical system 10B, the optical system 10C, or the optical system 10D, particularly of the side that includes the second optical-path adjustment module 600 and the image sensing assembly 700, according to some embodiments of the present disclosure. In some embodiments, the fixed portion 900 further include a second bottom 940. The second optical-path adjustment module 600 is accommodated in the second bottom 940. In some embodiments, the second optical-path adjustment module 600 includes a second optical-path adjustment element 630. The second optical-path adjustment element 630 has a reflective surface for changing the traveling direction of the light from the direction of the optical axis O, in which the light enters the second optical-path adjustment module 600, to the second direction D2. Therefore, the light may leave the second optical-path adjustment module 600 and enter the image sensing assembly 700 in the second direction D2. It should be noted that, in some other embodiments, similar to the first optical-path adjustment module 500, the one or more optical elements may be disposed on the light incident end and/or the light emitting end of the second optical-path adjustment element 630 for converging/diverging the light. In addition, the size, the type, and the position of the image sensing assembly 700 illustrated in the present disclosure are not intended to be limiting, but may be selected based on actual needs.

In some embodiments according to the present disclosure, the optical system 10, the optical system 10A, the optical system 10B, the optical system 10C, or the optical system 10D further includes a second optical-path adjustment-module driving assembly 650 for driving the second optical-path adjustment module 600. The second optical-path adjustment-module driving assembly 650 includes a fourth piezoelectric unit 651. The fourth piezoelectric unit 651 includes a fourth piezoelectric element 6511 and a fourth transmitting element 6512. The fourth piezoelectric element 6511 is fixedly connected to the fixed portion 900, especially to the second bottom 940. The fourth transmitting element 6512 may have an elongated rod shape extending along Z direction, connecting the fourth piezoelectric element 6511 and the second optical-path adjustment element 630. The fourth driving force is transmitted by the fourth transmitting element 6512 to the second optical-path adjustment element 630 or the entire second optical-path adjustment module 600 through the deformation of the fourth piezoelectric element 6511 in Z direction, so that the second optical-path adjustment element 630 or the entire second optical-path adjustment module 600 is movable in Z direction relative to the fixed portion 900. This may achieve the effect of optical compensation, whereby improving the optical quality. In some embodiments, the third piezoelectric element 5511 and the fourth piezoelectric element 6511 are disposed on the same side of the fixed portion 900 (e.g. on the side that is closer to the +Z direction). In some other embodiments, the third piezoelectric element 5511 and the fourth piezoelectric element 6511 may be disposed on different sides of the fixed portion 900.

Figure 11:
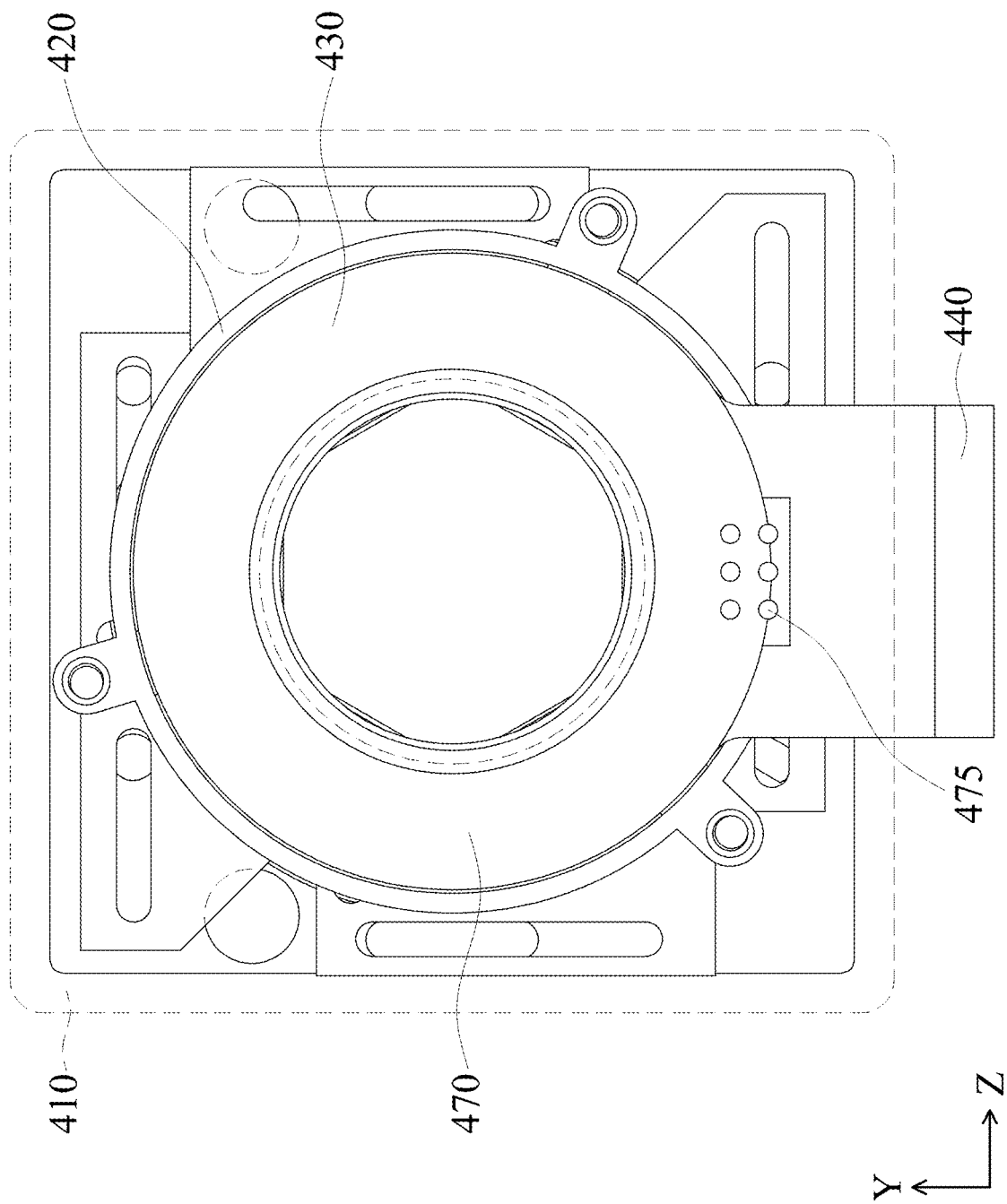
FIG. 11 is a front view of the light-quantity adjustment module, according to some embodiments of the present disclosure, wherein the frame is illustrated by dashed lines.

Next, referring to FIG. 11, FIG. 11 is a front view of the light-quantity adjustment module 400, according to some embodiments of the present disclosure. In some embodiments, the light-quantity adjustment module 400 includes a frame 410 (illustrated by dashed lines in FIG. 11), a light-quantity adjustment element 420, a driving portion 430, and a conducting portion 440. The optical system 10, the optical system 10A, the optical system 10B, the optical system 10C, or the optical system 10D further includes a control assembly 450 (see FIG. 12), a third sensing magnet 470, and a third sensing element 475. The light-quantity adjustment element 420, the driving portion 430, and the third sensing magnet 470 are accommodated in the frame 410. In some embodiments, the third sensing magnet 470 is connected to the light-quantity adjustment module 400. The third sensing element 475 corresponds to the third sensing magnet 470. The third sensing element 475 is disposed in a way that is fixed relative to the housing 910 (or to the fixed portion 900) for sensing the position of the light-quantity adjustment module 400 relative to the housing 910 (or to the fixed portion 900).

In some embodiments according to the present disclosure, the light-quantity adjustment element 420 is movable relative to the frame 410 for adjusting the light quantity passing through the light-quantity adjustment module 400. In some embodiments, the light-quantity adjustment element 420 may have a plurality of blades. The driving portion 430 is connected to the light-quantity adjustment element 420. An end of the conducting portion 440 is accommodated in the frame 410 and is connected to the driving portion 430. The other end of the conducting portion 440 extends beyond the light-quantity adjustment module 400 and protrudes from the frame 410 (as shown in FIG. 10), so as to electrically connect to the external control assembly 450 (not shown in FIG. 11). In some embodiments, the driving portion 430 may be one or more coils that correspond to the third sensing magnet 470. In this embodiments, the third sensing magnet 470 may also be the magnetic element for driving. The light-quantity adjustment element 420 is driven to move relative to the frame 410 via the electromagnetic driving force generated by the driving portion 430 and the third sensing magnet 470.

Figure 12:
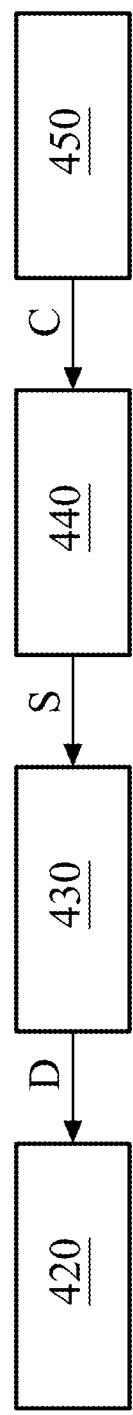
FIG. 12 is a schematic view of the signal transmission in the light-quantity adjustment module, according to some embodiments of the present disclosure.

Referring to FIG. 12, FIG. 12 is a schematic view of the signal transmission in the light-quantity adjustment module 400, according to some embodiments of the present disclosure. The control assembly 450 generates a control signal C and transmits the control signal C to the conducting portion 440. After the conducting portion 440 receives the control signal C, a signal S is generated and transmitted to the driving portion 430. After the driving portion 430 receives the signal S, the driving portion 430 interacts with the third sensing magnet 470 and generates a driving signal D. The driving signal D is then transmitted to the light-quantity adjustment element 420 to drive the light-quantity adjustment element 420 to move relative to the frame 410.

Figure 13:
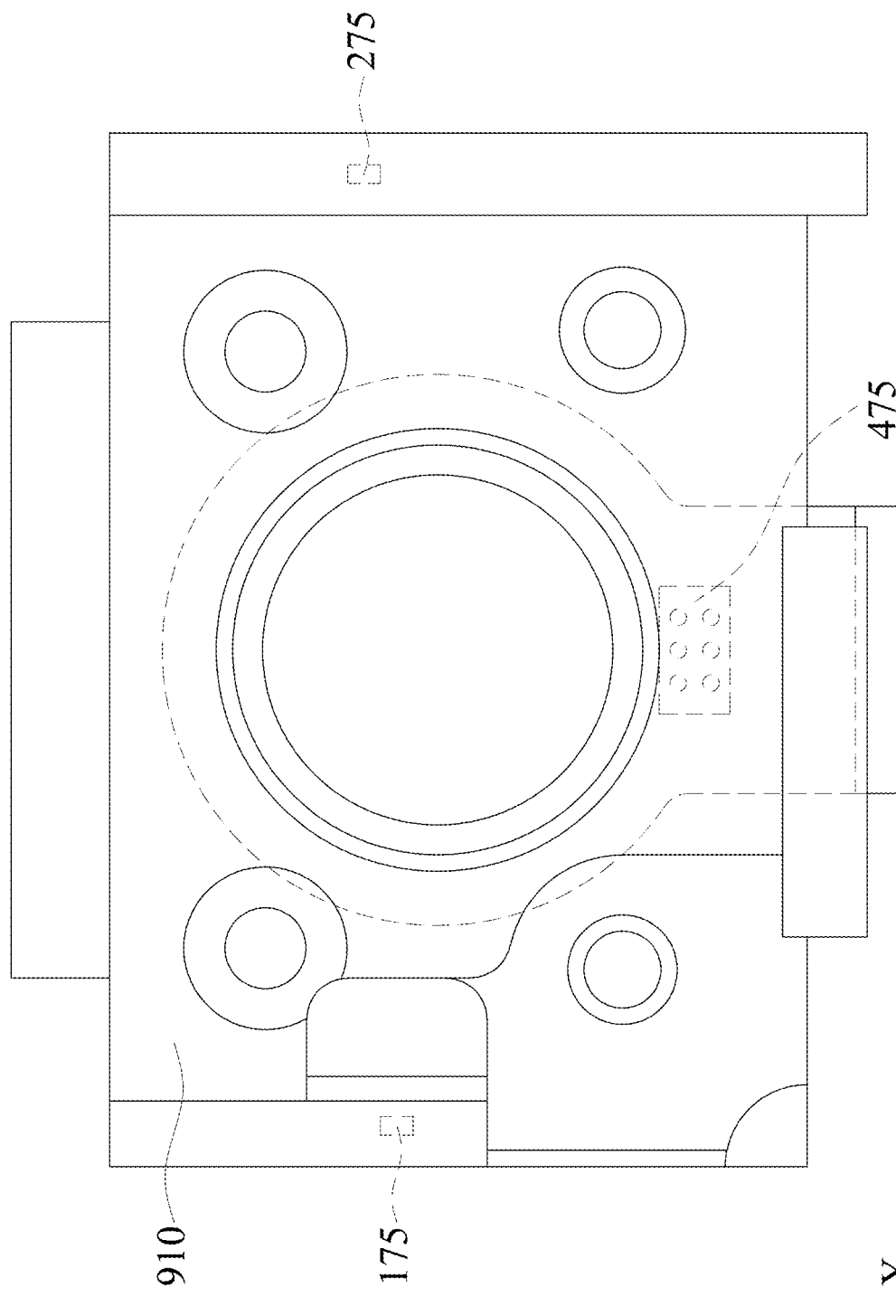
FIG. 13 is a front view of the housing and the internal elements inside the housing, according to some embodiments of the present disclosure.
Figure 14:
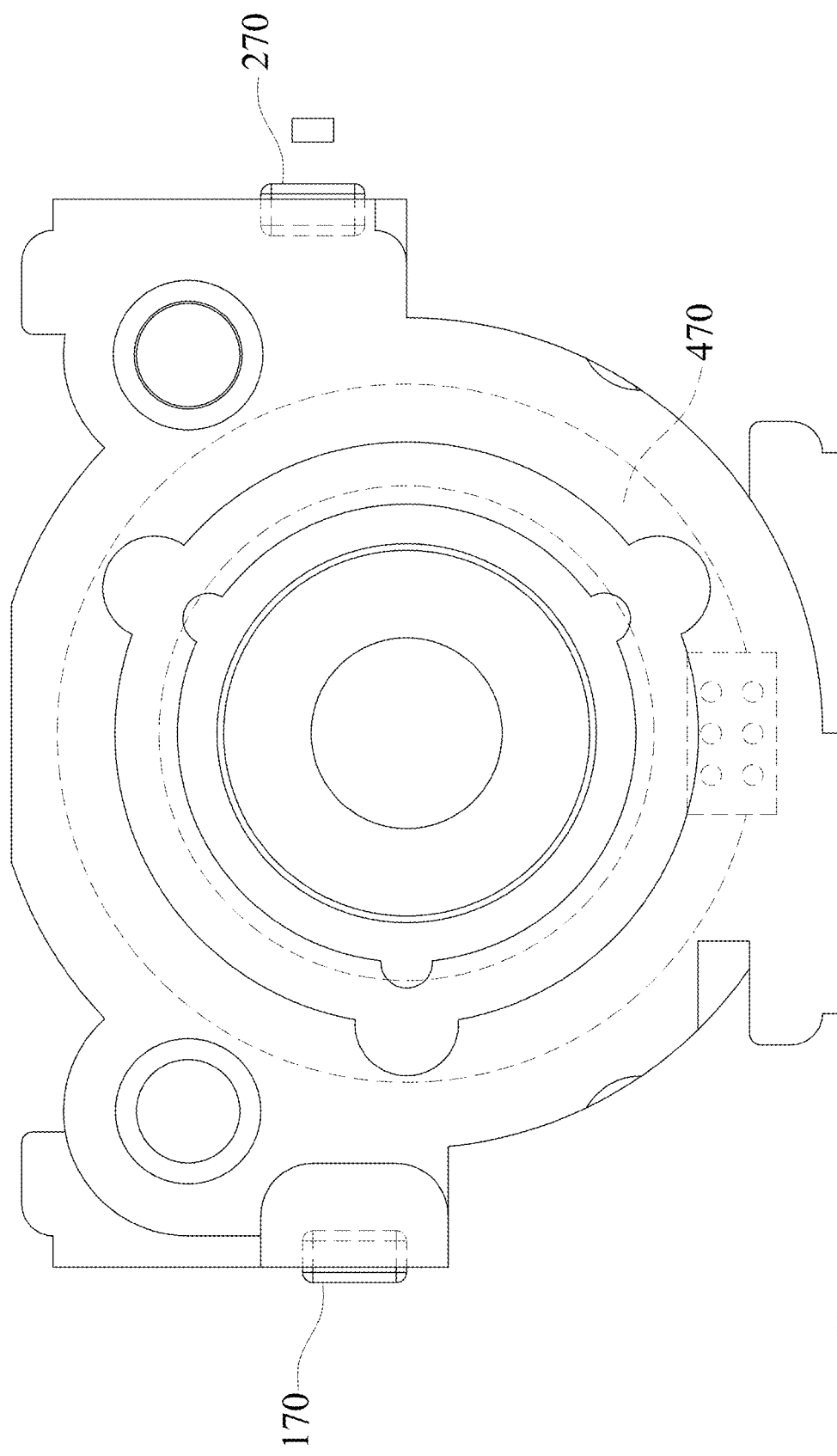
FIG. 14 is a front view of the internal elements inside the housing, according to some embodiments of the present disclosure.

Referring to FIGS. 13 and 14, FIG. 13 is a front view of the housing 910 and the internal elements inside the housing 910, and FIG. 14 is a front view of the internal elements inside the housing 910, wherein the housing 910 and the frame 410 of the light-quantity adjustment module 400 are not shown, according to some embodiments of the present disclosure. When viewed in the direction of the optical axis O (in this embodiment, X direction), of the first sensing element 175, the second sensing element 275, and the third sensing element 475, no two overlap each other. Of the first sensing magnet 170, the second sensing magnet 270, and the third sensing magnet 470, no two overlap each other as well. As a result, magnetic interference between the first optical module 100, the second optical module 200 and/or the light-quantity adjustment module 400 may be avoided when they move in the direction of the optical axis O, thereby improving the overall stability of the mechanism. In addition, when viewed in the direction that is perpendicular to the direction of the optical axis O (e.g. Y direction or Z direction in FIG. 13), of the first sensing element 175, the second sensing element 275, and the third sensing element 475, no two overlap each other. Of the first sensing magnet 170, the second sensing magnet 270, and the third sensing magnet 470, no two overlap each other as well. In the embodiments of the present disclosure, the configuration of the multiple sensing elements and the corresponding sensing magnets may effectively prevent the magnetic interference, but still is able to achieve the required optical effects to ensure good optical qualities.

In summary, the optical system (e.g. the optical system 10, the optical system 10A, the optical system 10B, the optical system 10C, or the optical system 10D) provided in the present disclosure includes a plurality of optical modules (e.g. the first optical module 100, the second optical module 200, the third optical module 300, etc.), a plurality of optical-path adjustment modules (e.g. the first optical-path adjustment module 500, the second optical-path adjustment module 600, etc.), and a light-quantity adjustment module 400. In the embodiments according to the present disclosure, users may dispose the light-quantity adjustment module 400 in any suitable location in the traveling direction of the light based on the requirements for optical effects. In various configurations, of the third sensing magnet 470 of the light-quantity adjustment module 400, the first sensing magnet 170 of the first optical module 100, and the second sensing magnet 270 of the second optical module 200, no two interfere each other when they are in motion. Additionally, every optical module and every optical-path adjustment module in the optical system utilizes a piezoelectric unit as its driving assembly, so as to further reduce the amount of magnetic elements to be installed and the magnetic interference induced thereby. Thus, the optical system in accordance with the present disclosure may provide good system stability and optical quality.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
a first optical module;
a second optical module; and
a light-quantity adjustment module; wherein the first optical module, the second optical module, and the light-quantity adjustment module are arranged in a direction of an optical axis;
wherein the optical system further comprises:
a first optical-path adjustment module, changing the traveling direction of a light ray from a first direction to the direction of the optical axis; and
a second optical-path adjustment module, changing the traveling direction of the light ray from the direction of the optical axis to a second direction;
wherein the first optical module, the second optical module, the first optical-path adjustment module, the second optical-path adjustment module, and the light-quantity adjustment module are arranged in the direction of the optical axis;
wherein the optical system further comprises a fixed portion, wherein the fixed portion includes a housing, wherein the first optical module and the second optical module are disposed within the housing;
wherein the optical system further comprises a first optical module driving assembly and a second optical module driving assembly, wherein the first optical module driving assembly comprises:
a first piezoelectric unit, including:
a first piezoelectric element connected to the housing; and
a first transmitting element connected to the first piezoelectric element and the first optical module;
wherein the first transmitting element transmits a first driving force to the first optical module, so that the first optical module is movable relative to the housing;
wherein the second optical module driving assembly comprises:
a second piezoelectric unit, including:
a second piezoelectric element connected to the housing; and a second transmitting element connected to the second piezoelectric element and the second optical module;
wherein the second transmitting element transmits a second driving force to the second optical module, so that the second optical module is movable relative to the housing;
a first optical-path adjustment-module driving assembly and a second optical-path adjustment-module driving assembly, wherein the first optical-path adjustment-module driving assembly comprises:
a third piezoelectric unit, including:
a third piezoelectric element connected to the fixed portion; and
a third transmitting element connected to the third piezoelectric element and the first optical-path adjustment module;
wherein the third transmitting element transmits a third driving force to the first optical-path adjustment module, so that the first optical-path adjustment module is movable relative to the fixed portion;
wherein the second optical-path adjustment-module driving assembly comprises:
a fourth piezoelectric unit, including:
a fourth piezoelectric element connected to the fixed portion; and
a fourth transmitting element connected to the fourth piezoelectric element and the second optical-path adjustment module; wherein the fourth transmitting element transmits a fourth driving force to the second optical-path adjustment module, so that the second optical-path adjustment module is movable relative to the fixed portion.

2. The optical system as claimed in claim 1, wherein the first direction is different from the second direction.

3. The optical system as claimed in claim 2, wherein the first direction and the second direction are perpendicular to the direction of the optical axis.

4. The optical system as claimed in claim 3, wherein the first direction is parallel to the second direction.

5. The optical system as claimed in claim 1, wherein the light-quantity adjustment module is positioned between the first optical module and the second optical module, and wherein the light-quantity adjustment module is movable along the direction of the optical axis relative to the housing.

6. The optical system as claimed in claim 5, wherein the light-quantity adjustment module is connected to the first optical module, and the light-quantity adjustment module and the first optical module are movable along the direction of the optical axis relative to the housing simultaneously.

7. The optical system as claimed in claim 5, wherein the light-quantity adjustment module is connected to the second optical module, and the light-quantity adjustment module and the second optical module are movable along the direction of the optical axis relative to the housing simultaneously.

8. The optical system as claimed in claim 1, wherein the light-quantity adjustment module is positioned between the first optical-path adjustment module and the first optical module.

9. The optical system as claimed in claim 8, wherein the housing has a first surface inside the housing, and the first surface is parallel to the first direction, wherein the light-quantity adjustment module is fixedly disposed on the first surface.

10. The optical system as claimed in claim 8, further comprising a third optical module positioned between the light-quantity adjustment module and the first optical module, wherein the third optical module is fixedly connected to the light-quantity adjustment module and the housing.

11. The optical system as claimed in claim 8, further comprising a third optical module positioned between the first optical-path adjustment module and the light-quantity adjustment module, wherein the light-quantity adjustment module is fixedly connected to the third optical module or the housing.

12. The optical system as claimed in claim 1, wherein the light-quantity adjustment module comprises:
   a frame; and
   a light-quantity adjustment element disposed within the frame, and movable relative to the frame.

13. The optical system as claimed in claim 12, further comprising a control assembly, wherein the light-quantity adjustment module further comprises:
   a driving portion connected to the light-quantity adjustment element; and
   a conducting portion, wherein one end of the conducting portion is connected to the driving portion, and the other end of the conducting portion extends out of the light-quantity adjustment module and is electrically connected to the control assembly;
   wherein the driving portion receives a signal from the conducting portion, driving the light-quantity adjustment element to move relative to the frame.

14. The optical system as claimed in claim 1, further comprising:
   a first sensing magnet connected to the first optical module;
   a first sensing element, corresponding to the first sensing magnet, disposed at the housing, and sensing a position of the first optical module relative to the housing;
   a second sensing magnet connected to the second optical module;
   a second sensing element, corresponding to the second sensing magnet, disposed at the housing, and sensing a position of the second optical module relative to the housing;
   a third sensing magnet connected to the light-quantity adjustment module; and
   a third sensing element, corresponding to the third sensing magnet, disposed at the housing, and sensing a position of the light-quantity adjustment module relative to the housing.

15. The optical system as claimed in claim 14, wherein of the first sensing element, the second sensing element, and the third sensing element, no two overlap each other when viewed in the direction of the optical axis.

16. The optical system as claimed in claim 14, wherein of the first sensing magnet, the second sensing magnet, and the third sensing magnet, no two overlap each other when viewed in the direction of the optical axis.

17. The optical system as claimed in claim 14, wherein of the first sensing element, the second sensing element, and the third sensing element, no two overlap each other when viewed in a direction that is perpendicular to the direction of the optical axis.

* * * * *